May 3, 1949.  A. O. WOOD ET AL  2,468,796
METHOD OF AND APPARATUS FOR
DUAL COIL INDUCTION HEATING
Filed June 17, 1944

INVENTORS.
Alden O. Wood
John J. Vaughan

Patented May 3, 1949

2,468,796

UNITED STATES PATENT OFFICE 2,468,796

METHOD OF AND APPARATUS FOR DUAL COIL INDUCTION HEATING

Alden O. Wood, Parma, and John T. Vaughan, Shaker Heights, Ohio, assignors to The Ohio Crankshaft Company, Cleveland, Ohio, a corporation of Ohio Application June 17, 1944, Serial No. 540,842

6 Claims. (Cl. 219—13)

The present application relates as indicated to dual coil induction heating and is directed primarily to apparatus and method for heat treating articles having sections generally unsymmetrical or articles which in heat treating require greater heating along one edge or side than along another edge or side. It is directed primarily to the progressive heat treatment of such articles. However, the apparatus hereinafter described is adapted to heating an article without any relative movement of the heater and the work piece. An aeroplane propeller blade has been used in the present case to exemplify an article adapted to our method of heating and a form of our apparatus adapted to heating such propeller blade is shown and described. By our apparatus and process it is possible to distribute heating according to any desired pattern along the periphery of a large variety of articles so as to heat one part to a high temperature while other parts along the periphery are heated to any desired lower temperature. On the other hand, substantially all parts of a peripheral zone of the article can be heated with a high degree of uniformity.

Heretofore, it has been customary to heat such articles in two operations. The part requiring the greater heating being usually heated in the first operation by confining substantially all the heat to that part and then subsequently heating the entire article, the second operation of necessity affecting the result of the first operation and usually being limited to tempering only. Accordingly it has been an object of this invention to provide means for distributing heating along the periphery of an article to be heat treated. Another object has been to distribute such heating according to a preselected pattern. A further object has been to provide a heater adapted to either stationary or progressive heating. An additional object has been to provide an inductor adapted to inducing high frequency heating currents of different density in adjacent parts of the article being heated. A still further object has been to provide a method of applying selected elements of an inductor to accomplish the desired heating.

With these and other objects in view the said invention comprises the apparatus hereinafter described together with the method of selecting and applying elements of that apparatus to accomplish desired heating.

Figure 1:
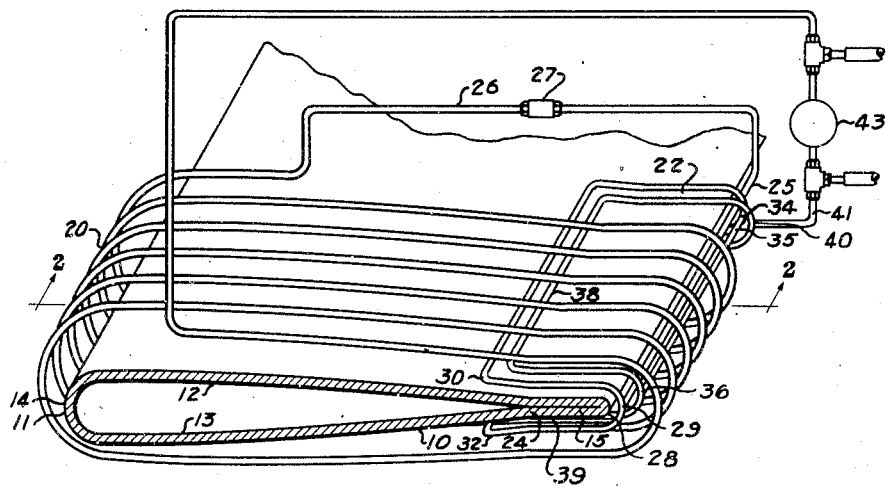
Figure 2:
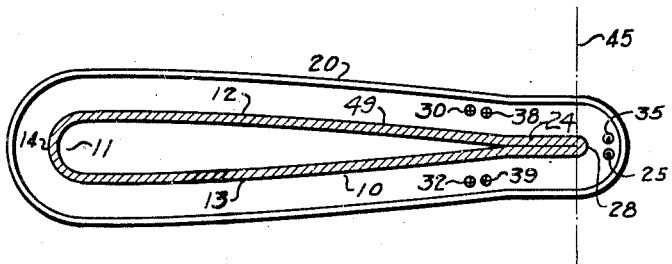

The form of our apparatus adapted to the heat treatment of a propeller blade is illustrated in the accompanying drawings in which Fig. 1 illustrates in perspective the general arrangement of elements comprising the preferred form of inductor. Fig. 2 is a section substantially at 2—2 of Fig. 1, indicating generally the instantaneous direction of current in the inductor.

Referring now to the drawing the propeller blade 10, a fragment of which is shown in section, is somewhat exaggerated in form for purpose of illustration. This blade comprises the hollow and approximately elliptical leading portion shown generally at 11 having upper and lower walls 12 and 13 and leading face 14 and the solid trailing portion 15, the latter being formed usually by welding together edge adjacent portions of the upper and lower walls. It is to correctly and substantially uniformly and simultaneously heat the entire periphery of this section that the inductor mechanism illustrated and hereinafter explained is particularly adapted, although not so limited. An inductor formed by winding a conductor in a generally helical form around the propeller blade and in spaced relation thereto will not provide heating of the required uniformity. To accomplish the desired uniform heating two coils are provided as shown. Coil 20 of general helical form extends around the blade in relatively closely spaced relation and with a longitudinal axis concurrent with a longitudinal axis of the blade section. Coil 22 is wound over the narrow edge of the blade as is shown and hereinafter described. Coils 20 and 22 are shown replaceably connected in series.

If we consider coil 20 alone, it will be found that this coil will induce current flowing peripherally in parts 11, 12, 13, 14 and a part of portion 15, these parts being in series. The portion 15 presenting a greatly enlarged area for the flow of this induced peripheral current will offer very little resistance for current of moderately high frequency. This results in a very low $RI^2$ product for this portion and consequently a very low heating rate is accomplished. In fact this solid trailing edge portion tends to act as a conductor in itself with induced current flowing peripherally therein. The current flowing peripherally in parts 12, 13 and 14 in passing through region 24 of edge portion 15 will tend to oppose such independent current as is induced to flow peripherally in this portion further reducing the heating effect in this edge portion.

To overcome the deficiency of heating in region 15 coil 22 is provided. This coil is made of several conductors connected in series, some of the conductors being divided into two substantially parallel elements. This coil is generally connected in series with coil 20 although such series arrangement is not necessary. The advantages of such series connection is hereinafter explained. When connected in series with coil 20 such connection may be made for instance by connecting conductor 25 of coil 22 to lead 26 of coil 20 as at 27. Conductor 25 is formed to extend along and substantially parallel with edge 28 of the blade 10. At 29 this conductor is divided into two branches 30 and 32 which extend away from edge 28 and are generally perpendicular to the edge, lying generally parallel with upper and lower surfaces of the blade. They then turn to extend generally parallel to the edge for a substantial distance and then back toward the edge, thus forming two oppositely disposed generally parallel rectangular loops lying close to the upper and lower surfaces of the blade. These two conductors unite at 34 to form conductor 35 which extends along edge 28 in generally parallel relation with both this edge and with conductor 25. At 36 conductor 35 is divided into two branches 38 and 39 which form two additional generally parallel rectangular loops also lying generally parallel with the opposite faces of the blade and substantially parallel with corresponding loops formed by conductors 30 and 32. Conductors 38 and 39 are united at 40 to provide conductor 41 which completes the circuit to generator or other power source 43. The general arrangement of the conductors of coil 22 and the flow of current therein will be readily understood from Fig. 2 in which the conductors are shown in section and to which the above reference characters have been applied. It will be observed that the direction of current in the conductors is such as to provide a flux field not greatly unlike that of a helically wound conductor, the direction of the field being generally along line 45 corresponding to the axis of a helix which field is thus generally through and perpendicular to the plane of the faces of trailing edge portion 15 of the propeller blade.

A typical blade heated by this inductor had the following dimensions: The overall width from 14 to 28 was 11.4 inches; the overall thickness from 12 to 13 was 1⅛ inches; the thickness at 24 was $\frac{7}{16}$ inch, and the thickness of the stock from which the blade was made as indicated at 12 was approximately $\frac{7}{32}$ inch. To obtain substantially uniform heating of this blade the space between the inductor coil 20 and the blade 10 was varied along the periphery of the blade. The space between coil 20 and the leading face of the blade at 14 was about $\frac{5}{16}$ inch. This space was increased along the upper and lower sides of the blade to ⅝ at points opposite 12 and 13. The space was gradually reduced to about ½ inch at 49 and was then increased to about ⅝ inch over the trailing edge portion to provide space for the coils of inductor 22. The coils of inductor 22 were held at a distance of about ¼ inch from the blade. The space between coils 20 and 22 was such as to provide room for a minimum amount of insulation. The widths of the coils were sufficient to heat a peripheral zone of the blade 1¾ inches wide. When these inductor coils were supplied with power at a rate of thirteen kilowatts at a frequency of 9600 cycles per second the 1¾ zone of the blade was satisfactorily heated in one hundred seconds to temperatures which varied from a minimum of 1650° F. at points 14 and 28 to 1840° F. along the upper and lower sides at 12 and 13. Less variation in temperature can be readily provided by further increasing the spacing of coil 20 from the sides 12 and 13 of the blade and by increasing the number of conductors in coil 22.

Coils 20 and 22 can be supplied by current from separate and independent sources and at different frequencies. However, several advantages are derived from connecting these coils in series as shown. Among these is the convenience of simpler connections and less parts to handle. A further advantage results from the increased heating effect. The flux field from coil 22 and the enveloping part of the coil 20 are substantially at right angles to each other. The resulting flux field which is the geometric sum of these two fields is thus always greater than either alone. If these coils are supplied from separate sources care to keep them in correct phase relation would be required as otherwise one would detract from the effect of the other and the resulting flux field would become the geometrical difference rather than the geometrical sum of the two fields. This would result in non-uniform heating and a waste of power. By supplying current to coils 20 and 22 from separate sources, but at the same frequency, the phase relation of the current in the two coils can be changed either mechanically or by other means, such as by a variable condenser, to increase or decrease the geometric sum of the fields from the two coils.

It will be understood that with extremely high frequencies coil 20 alone would cause heating through the entire periphery of the blade, but such heating could be accomplished only at a considerable waste of power. Such waste of power and low efficiency would result from the necessity of excessive spacing of the inductor from the blade in the regions of the sides at 12 and 13 to prevent overheating in these regions when a closer and more satisfactory coupling could not be provided at points 14 and 28 due to mechanical limitations.

As illustrated in the drawing, the inner inductor usually comprises several substantially parallel members divided into two groups lying along opposite sides and inwardly from an edge of the article, and one or more conductors substantially parallel to the groups and lying adjacent to and beyond the edge. The conductors of the groups are connected in parallel and the conductors adjacent to the edge are so connected in series with the parallel group conductors that current in the groups is opposite to that in the edge adjacent conductors. Elements connecting the groups to the edge conductors may be disposed in numerous ways, but are usually curved around the edge of the article with suitable clearance. The conductors of the groups are thus spaced from the edge adjacent conductors to provide a high density flux field threading transversely through the edge of the article when high density current is supplied to the conductors. By varying the spacing from each other of the members of the group of conductors lying along the opposite sides of the article, the distribution of the transverse flux is controlled to vary a distribution of heating inwardly from the edge of the article so that the edge can be heated more than or less than parts lying inwardly from the edge.

It will be observed from the preceding description that the outer inductor is generally helical and of such form as to receive the longitudinal article to be heated with such clearance between the article and the inductor as to provide space for the inner inductor therebetween, the inner inductor serving as means for focusing additional heating flux into a selected part of the article. Since the outer inductor extends generally helically around the article, the flux therefrom passes longitudinally through the longitudinal edge while the flux from the inner inductor passes transversely through the edge in a direction substantially at right angles to the flux from the outer inductor. The flux fields are thus substantially at right angles to each other and the resulting heating flux is therefore the geometric sum of both fields as hereinbefore pointed out.

The coils of both inductors are usually made of insulated copper tubing and are joined as at 27 by couplings ordinarily employed for connecting such tubing. At 50 and 51, T fittings are employed through which cooling fluid is supplied from hose lines 52 and 53 so that this fluid is circulated in series through both coils 20 and 22.

Other modes of applying the principle of our invention may be employed instead of the one explained, change being made as regards details of the product described as well as in the method of producing it and in the form of apparatus shown for accomplishing the method explained, provided those changes or their equivalents are defined by the following claims.

We, therefore, particularly point out and distinctly claim as our invention:

1. In apparatus for inductively heating a longitudinal edge of a metallic article, an inductor comprising an outer member adapted to encircle a part of the article, an inner member comprising a loop having a conductor adapted to extend arcuately over an edge of the article and to lie in part within the outer member, the loop comprising a conductor adapted to lie adjacent to and along an edge of the article and two conductors adapted to lie along and adjacent to opposite sides of the article inwardly from its edge, the arcuate conductor serving as means for joining the said adjacent members to the edge adjacent member and to each other, means connecting the inner and outer members of the inductor in series, and means for supplying inducing current to the inductor.

2. In apparatus for inductively heating a metallic article, an inductor comprising an outer inductor member adapted to encircle a part of the article in spaced relation, and an inner inductor member, the outer inductor member having an enlarged portion adapted to lie along an edge of the article and to receive the inner member in substantially telescoping relation, the inner member lying between the outer member and the edge of the article when the article is in heating position to supply additional heating flux to the said edge, the inner member comprising three generally parallel conductors, the said parallel members defining two planes intersecting substantially in one of the conductors and forming a dihedral angle to receive the edge of the article, means connecting the aforesaid inner and outer members in series and means for supplying inducing current to the inductor.

3. In apparatus for inductively heating a metallic article, an inductor comprising an outer member adapted to encircle a part of the article and to lie in spaced relation thereto, an inner member extending into a space between the outer member and a part of the article when the article is in heating position in the outer member, the inner member comprising a plurality of pairs of parallel conductors, means connecting the parallel conductors in series with a single conductor, the conductors of each pair being adapted to lie on substantially opposite sides of a portion of the part of the article and being joined to the single conductor at each end of the pair by conductors having bends corresponding with the edge contour of the article, means connecting the outer inductor member to the inner inductor member, and means for supplying inducing current to the inductor.

4. In apparatus for inductively heating a metallic article, an inductor comprising an outer member adapted to encircle a part of the article and to lie in spaced relation thereto, the said member having a magnetic axis adapted to extend longitudinally through the article, an inner member extending into a space between the outer member and a part of the article when the article is in heating position in the outer member, the inner member having a magnetic axis disposed to extend transversely through a part of the article and generally perpendicular to the magnetic axis of the outer member, and means for supplying inducing current to the inductor.

5. In a method of controlling a distribution of heating in a current conducting article, the steps comprising moving the article into a primary high frequency flux field to heat a section of the article and simultaneously directing an angularly disposed supplemental flux field of high intensity into a part of the said section and over a substantial length thereof to produce a heating effect in the said part of the section.

6. In a method of uniformly heating a longitudinal current conducting article having a relatively thinner edge part, the steps comprising directing a flux field of a selected frequency longitudinally through the article, and substantially simultaneously directing a flux field of the same frequency but of greater concentration transversely through the edge part, to geometrically combine the fields to concentrate heating in the said edge part.

ALDEN O. WOOD.
JOHN T. VAUGHAN.

REFERENCES CITED

The following references are of record in the file of this patent:

UNITED STATES PATENTS

| Number | Name | Date |
|---|---|---|
| 1,845,322 | Nauhauss | Feb. 16, 1932 |
| 2,052,010 | Bailey | Aug. 25, 1936 |
| 2,181,445 | Adams | Nov. 28, 1939 |
| 2,205,424 | Leonard | June 25, 1940 |
| 2,249,909 | Pisarev | July 22, 1941 |
| 2,328,225 | Morey | Aug. 31, 1943 |
| 2,371,459 | Mittelmann | Mar. 13, 1945 |

OTHER REFERENCES

Heat Treating and Forging, vol. 27, Mar. 1941, page 138.

The Welding Engineer, July, 1943, page 43.

G. E. Review, December 1943, page 680.